United States Patent
Denk

(12) 
(10) Patent No.: US 6,249,379 B1
(45) Date of Patent: Jun. 19, 2001

(54) OPTICAL BEAM POWER CONTROLLER USING A TILTABLE BIREFRINGENT PLATE

(75) Inventor: Winfried Denk, Berkeley Heights, NJ (US)

(73) Assignee: Agere Systems Guardian, Orlando, FL (US)

( * ) Notice: Subject to any disclaimer, the term of this patent is extended or adjusted under 35 U.S.C. 154(b) by 0 days.

(21) Appl. No.: 09/360,321

(22) Filed: Jul. 23, 1999

Related U.S. Application Data

(60) Provisional application No. 60/129,504, filed on Apr. 15, 1999.

(51) Int. Cl.[7] .................................................. G02B 5/30
(52) U.S. Cl. .......................... 359/494; 359/501; 359/497
(58) Field of Search ................................. 359/501, 494, 359/497; 372/105, 29

(56) References Cited

U.S. PATENT DOCUMENTS 5,033,828 * 7/1991 Haruta ................................. 359/484

* cited by examiner

*Primary Examiner*—Darren Schuberg
*Assistant Examiner*—Fayez Assaf
(74) *Attorney, Agent, or Firm*—Lowenstein Sandler PC

(57) ABSTRACT

The present invention is an inexpensive optical beam power controller for providing fast, continuous control of a linearly polarized optical beam, such as a beam from a laser. In essence, the controller comprises a birefringent plate tiltable in relation to the beam and a polarization analyzer. Alternative double pass embodiments reduce beam displacement and the required tilt angle.

4 Claims, 4 Drawing Sheets

OPTICAL BEAM POWER CONTROLLER USING A TILTABLE BIREFRINGENT PLATE

CROSS REFERENCE TO RELATED APPLICATION

This application claims the benefit of U.S. Provisional application Ser. No. 60/129,504 of identical title filed Apr. 15, 1999.

FIELD OF THE INVENTION

This invention relates to optical beam power controllers and, in particular, to power controllers using a tiltable birefringent plate for fast, continuous control.

BACKGROUND OF THE INVENTION

Optical beam power controllers are useful in a wide variety of practical and experimental applications such as optical communications, optical instrumentation and optical inspection systems. Typically the beam is a linearly polarized laser beam.

A wide variety of techniques have been used to control beam power, but none provide fast, continuous control with low loss, small beam displacement and minimal group-velocity dispersion. Traditional methods include translation of neutral density filters with spatially varying optical density. They also include acousto-optical, electro-optical, and liquid-crystal modulation as well as variation of Fresnel reflections and the rotation of half-wave plates. The methods vary widely in their speed, dynamic range, effects on beam-pointing, wavelength sensitivity, dispersion, and cost.

Electro-optical and acousto-optical methods are by far the fastest (sub-$\mu$s). They are widely employed where speed is essential such as in pulse-pickers or in fluorescence lifetime instrumentation. Unfortunately they are expensive.

Acousto-optical modulators (Bragg cells) have a large dynamic range but high insertion losses (10–20%). They also have angular wavelength dispersion in the diffracted beam which complicates use with very short laser pulses. The fundamental (undiffracted) beam affords, at best, a 10:1 intensity modulation.

Electro-optical modulators (Pockels-cells) require high voltages or small apertures, which complicates alignment, in conjunction with a long optical pathlength, which causes group-velocity dispersion.

Methods that involve the mechanical movement of optical elements are slower than acousto-optical and electro-optical techniques but are generally more cost effective. Variable neutral density (ND) filters suffer from intensity variations across the beam, laser power dependent thermal-lensing effects, and beam pointing variations. Rotation of half-wave plates suffers from pointing variations if the plate surfaces are not perfectly parallel. Both variable ND filters and rotating half-wave plates require typically tens of milliseconds to change the intensity. Accordingly there is a need for an inexpensive beam power controller providing fast, continuous control.

SUMMARY OF THE INVENTION

The present invention is an inexpensive optical beam power controller for providing fast, continuous control of a linearly polarized optical beam, such as a beam from a laser. In essence, the controller comprises a birefringent plate tiltable in relation to the beam and a polarization analyzer. Alternative double pass embodiments reduce beam displacement and the required tilt angle.

BRIEF DESCRIPTION OF THE INVENTION

The nature, advantages and various additional features of the invention will appear more fully upon consideration of the illustrative embodiments now to be described in detail in connection with the accompanying drawings. In the drawings:

FIG. 1 schematically illustrates an optical beam power controller in accordance with the invention;

It is to be understood that these drawings are for purposes of illustrating the concepts of the invention and, except for the graphs, are not to scale.

DETAILED DESCRIPTION

Figure 1:
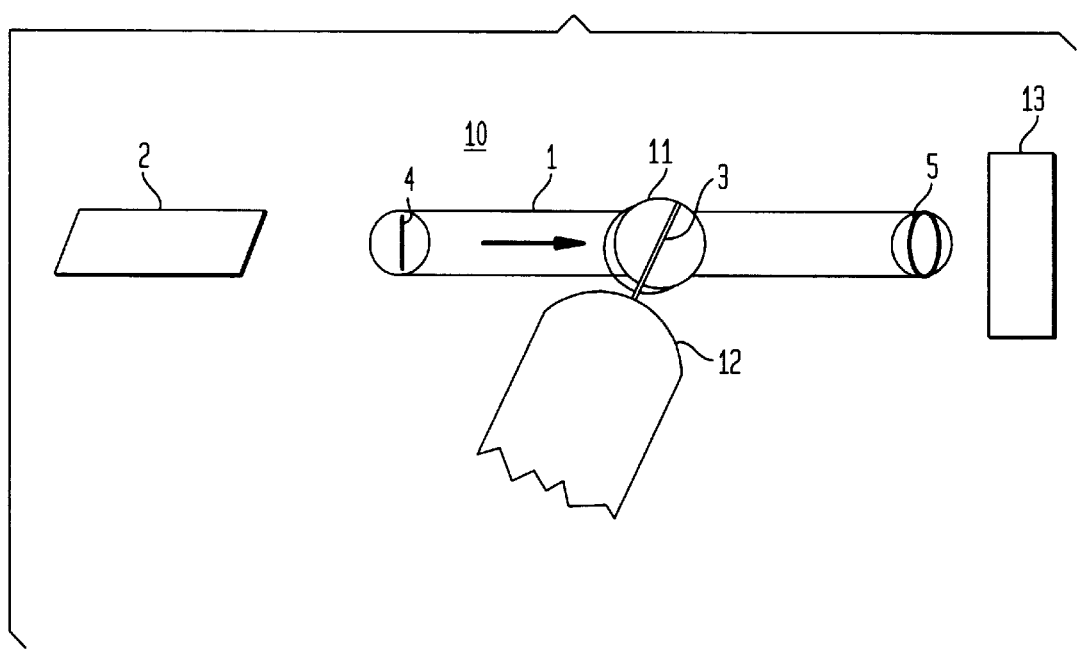

Referring to the drawings, FIG. 1 schematically illustrates an optical beam power controller 10 comprising a birefringent plate 11 mounted on a rotating scanner 12 and a polarization analyzer 13. The birefringent plate 11 is an optically uniaxial birefringent crystal having a pair of polished plane parallel surfaces perpendicular to its optical axis.

The scanner 12 is advantageously a galvanometer scanner such as those marketed for laser beam scanning. Such scanners are typically equipped with precise feedback control of their angular position which can be set by an externally applied analog voltage. Such scanners can typically set to a new tilt angle in about 300 $\mu$S. The scanner can thus provide a stable and easily controllable angle for plate 11.

In operation, the plate 11 is disposed in the path of a linearly polarized optical beam 1 such as the beam from a laser 2. The axis of rotation 3 of the plate is oriented to control the tilt of the plate in relation to the beam 1. It is preferably perpendicular to the beam. The most effective orientation of the axis of rotation 3 is at a 45° angle to the direction of polarization 4 of beam 1. The scanner controls the angle between the beam and the plate parallel surfaces. While no bifringence is induced in a beam normal to the plate, tilting the plate introduces a variable degree of ellipticity in the polarization 5 of the transmitted beam that is converted into power variation by the analyzer 13.

Figure 2:
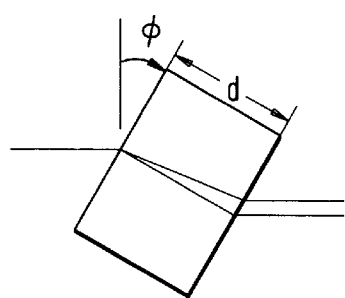
FIG. 2 shows an idealized model of the birefringent plate used in the controller of FIG. 1.

FIG. 2 shows an idealized model of plate 11 in relation to beam 1 useful in describing the mechanism by which beam power is controlled. The ellipticity induced as a function of plate thickness (d) and tilt angle ($\phi$) can be determined as follows. We first split the field in its polarization components parallel ($E_\parallel$) and perpendicular ($E_\perp$) to the axis of plate rotation. To achieve complete modulation the axis of plate rotation has to be at an angle of 45° to the plane of the incoming polarization which implies ($E_\parallel = E_\perp$). The difference between the phase shifts $\delta_\parallel$ and $\delta_\perp$ as a function of $\phi$ and d can be calculated using $$\delta_{\|} - \delta_{\perp} = 2\pi \frac{d}{\lambda} \left[ \frac{n_0}{\cos(\vartheta_{\|})} - \frac{n_{\mathit{eff}}(\vartheta_{\perp})}{\cos(\vartheta_{\perp})} - \cos(\phi)[\sin(\vartheta_{\|}) - \sin(\vartheta_{\perp})] \right],$$

where $n_O$ and $n_e$ are the refractive indices for ordinary and extraordinary beams, respectively. $\partial_{\|}$ and $\partial_{\perp}$ are the angles between propagation direction and optical axis (which at the same time is the plate normal) inside the material. $\partial_{\|}$ and $\partial_{\perp}$, which can be calculated using the derivation in section 14.3.2 of Born and Wolf, *Principles of Optics* (New York:Pergamon, 1980). For the $E_{\|}$ component we can simply use Snell's law:

$$\partial_{\|} = \arcsin[\sin(\phi)/n_0],$$

For $E_{\|}$ the use of Snell's law is complicated by the fact that the effective refractive index ($n_{\mathit{eff}}$) for the refracted beam depends on $\partial_{\perp}$, $$n_{\mathit{eff}}(\partial_{\perp}) = [\cos^2(\partial_{\perp})/n_0^2 + \sin^2(\partial_{\perp})/n_e^2]^{-\frac{1}{2}},$$

and $\partial_{\perp}$, of course, depends on $n_{\mathit{eff}}$ because of Snell's law $$\partial_{\perp} = \arcsin[\sin(\phi)/n_{\mathit{eff}}(\partial_{\perp})].$$

Resolving these conditions we find $$\vartheta_{\perp} = \arccos \sqrt{\frac{n_0^2(n_0^2 - \sin^2 \varphi)}{n_0^2 n_e^2 + \sin^2(n_e^2 - n_0^2)}},$$

The fraction of the power passing an analyzer oriented parallel to the initial polarization (hereafter "relative power") is $$\frac{P}{P_0} = \cos^2(\delta_{\|} - \delta_{\perp}).$$

Figure 3:
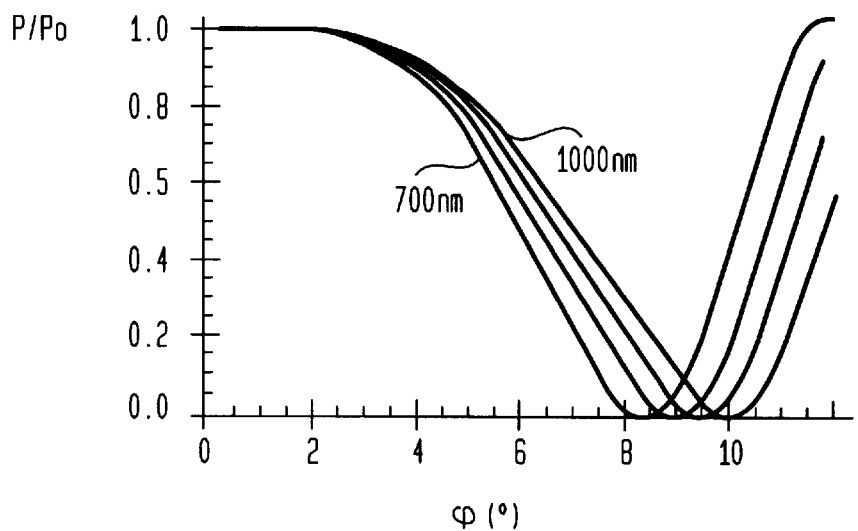
FIG. 3 is a graphical illustration useful in understanding the operation of the controller of FIG. 1.

FIG. 3 is a graphical illustration showing the relative power $P/P_0$ versus tilt angle $\phi$ at various wavelengths for the plate modeled in FIG. 2.

Figure 4:
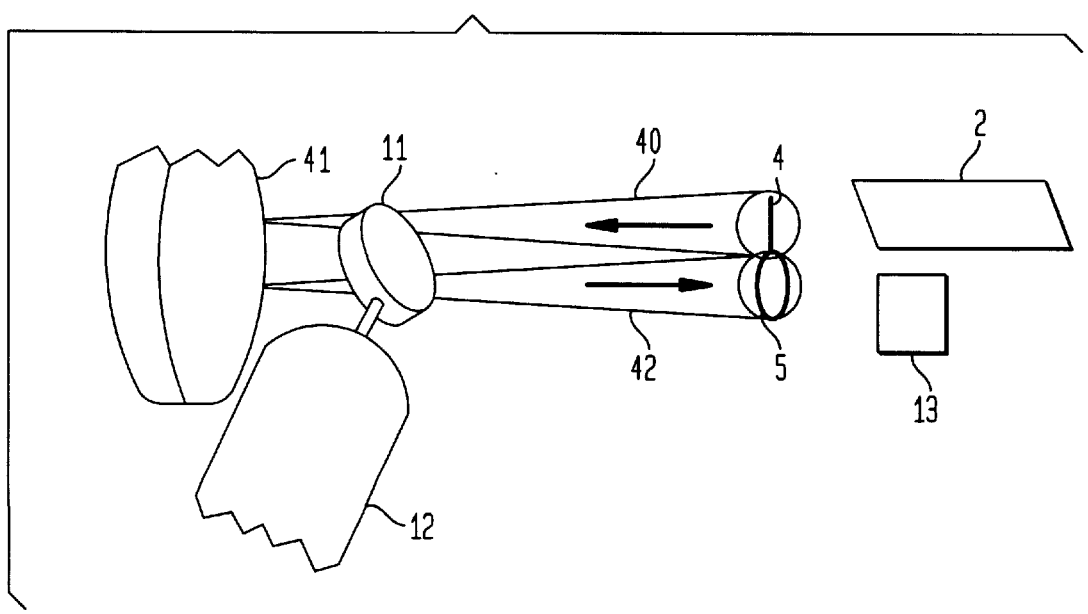
FIG. 4 shows a double pass controller.

FIG. 4 shows an alternative embodiment of a beam power controller wherein an incident beam 40 reflects from a mirror 41 to pass twice through the plate 11. Separation of the incident beam 40 from the reflected beam 42 is effected by a small angular displacement of mirror 41

This double pass configuration eliminates the beam displacement that results from passing through tilted plate 11 and, in addition, doubles the birefringent phase shift leading to a reduction of the required tilt angle. The double pass configuration also cancels effects due to circular birefringence.

Figure 5:
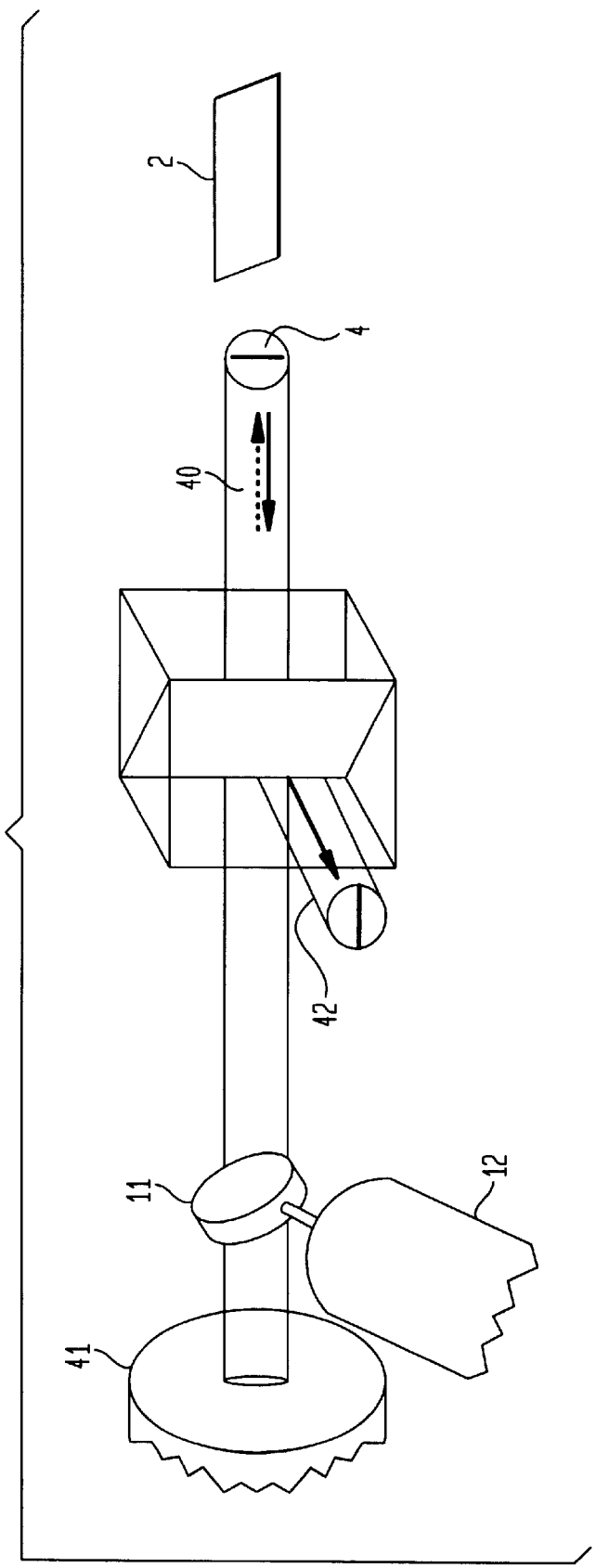
FIG. 5 illustrates an alternative double pass controller.

FIG. 5 illustrates an alternative form of the double pass beam power controller wherein a polarizing beam splitter 50 separates the two beams.

Figure 6:
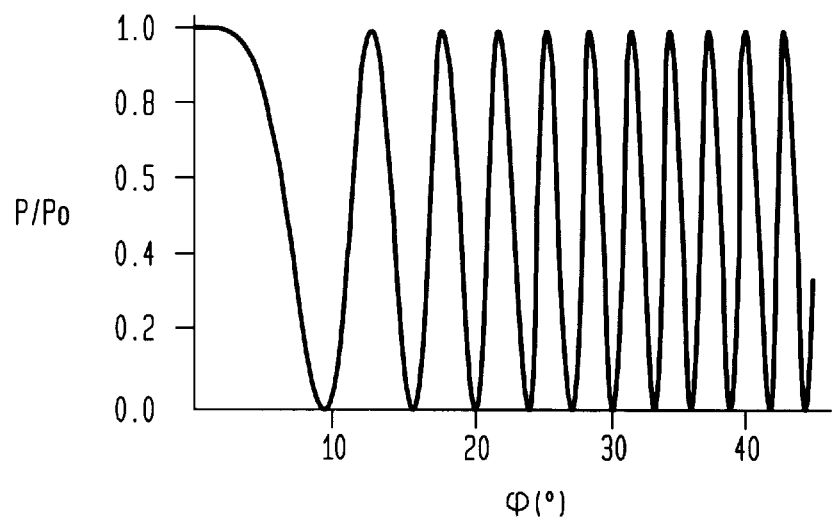
FIGS. 6 and 7 are graphical illustrations useful in understanding the operation of the embodiments of FIGS. 4 and 5.

FIG. 6 is a graphical illustration showing the expected relative power $P/P_0$ in a double pass configuration as a function of tilt angle $\phi$. The variation is calculated for a 1 mm thick crystalline quartz plate at a wavelength of 800 nm.

A preferred application for the controllers of FIGS. 1, 4 and 5 is for the fine control of laser power in multiphoton laser scanning microscopy.

The invention may now be better understood by consideration of the following specific example.

EXAMPLE 1

A custom-made quartz plate (5 mm dia., 1 mm thick, AR-coated for 700–1000 mm; CVI Laser) was mounted on a fast galvo-scanner (Model 6800; Cambridge Technology). The vertically polarized beam from a Ti: sapphire laser (Tsunami; Spectra Physics) running at 800 nm, mode-locked (half power points of the spectrum: 813 nm, 823 nm) was double passed through the plate in the configuration shown in FIG. 4. The beam power as a function of scanner deflection was measured after passing a polarizing beam-splitter cube (IR broad-band dielectric; CVI Laser) that was located after the tilt plate and oriented to transmit the laser maximally without the bifringent plate in place. The angle of the scanner axis was then optimized to obtain the lowest possible intensity at the first minimum. The angle of the plate deflection was inferred from the simultaneously recorded scanner-position feedback signal.

Figure 7:
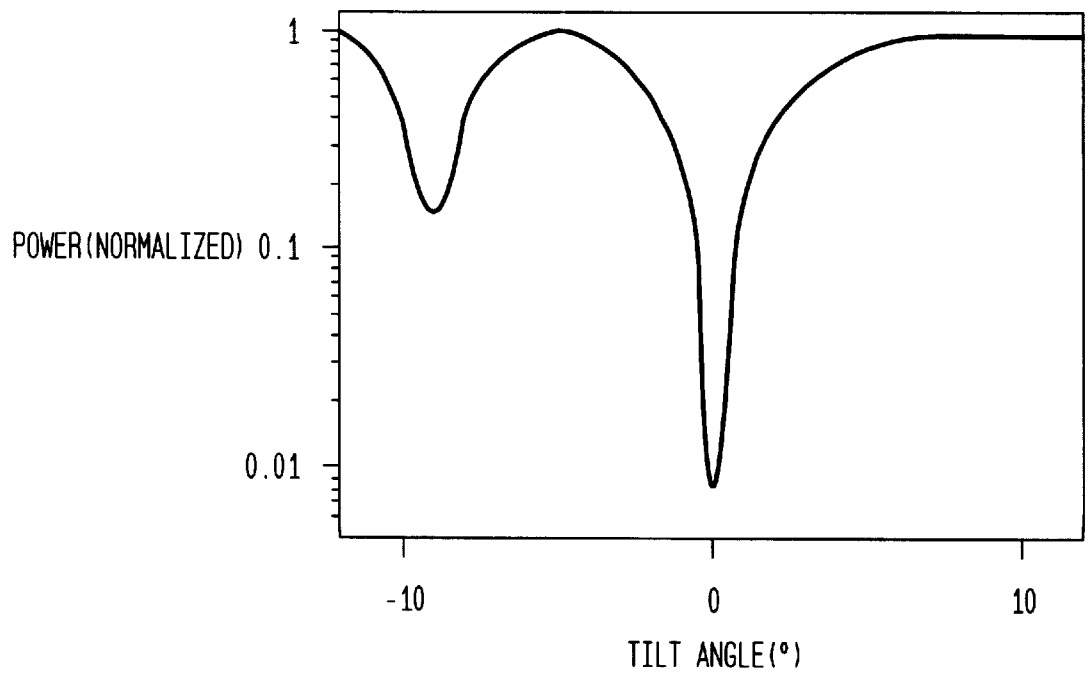

FIG. 7 plots the normalized laser power as a function of the plate tilt for the plate of Example 1. The zero tilt angle is measured relative to the scanner resting position and does not correspond to the plate axis and beam propagation axis being parallel as in FIG. 6.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. An optical beam power controller for controlling the power in a linearly polarized optical beam comprising:

a birefringent plate having an optical axis and a pair of parallel surfaces perpendicular to the optical axis;

a scanner for controllably tilting the plate in the path of the beam;

a mirror for reflecting a beam incident onto and passing through the plate back through the plate;

and a polarization analyzer for receiving the reflected beam transmitted through the plate to form a double pass controller.

2. An optical beam power controller according to claim 1 wherein the scanner tilts the plate around an axis perpendicular to the beam.

3. The controller of claim 1 wherein the reflected beam is displaced with respect to the incident beam.

4. The controller of claim 1 further comprising a polarizing beam splitter to separate the incident beam and the reflected beam.

* * * * *